US009898670B2

(12) United States Patent
Poledna

(10) Patent No.: US 9,898,670 B2
(45) Date of Patent: Feb. 20, 2018

(54) METHOD AND DEVICE FOR OBSERVING THE ENVIRONMENT OF A VEHICLE

(71) Applicant: FTS Computertechnik GmbH, Vienna (AT)

(72) Inventor: Stefan Poledna, Klosterneuburg (AT)

(73) Assignee: FTS Computertechnik GmbH, Vienna (AT)

( * ) Notice: Subject to any disclaimer, the term of this patent is extended or adjusted under 35 U.S.C. 154(b) by 26 days.

(21) Appl. No.: 15/103,952

(22) PCT Filed: Dec. 5, 2014

(86) PCT No.: PCT/AT2014/050295
§ 371 (c)(1),
(2) Date: Jun. 24, 2016

(87) PCT Pub. No.: WO2015/085338
PCT Pub. Date: Jun. 18, 2015

(65) Prior Publication Data
US 2016/0314365 A1    Oct. 27, 2016

(30) Foreign Application Priority Data
Dec. 13, 2013  (AT) .............................. A 50823/2013

(51) Int. Cl.
*G06K 9/00* (2006.01)
*G06K 9/20* (2006.01)
(Continued)

(52) U.S. Cl.
CPC ............ *G06K 9/00805* (2013.01); *B60R 1/00* (2013.01); *G06K 9/209* (2013.01); *G06K 9/32* (2013.01);
(Continued)

(58) Field of Classification Search
CPC ............... B60R 11/04; B60R 2300/107; B60R 2300/301; B60R 2300/303;
(Continued)

(56) References Cited

U.S. PATENT DOCUMENTS 5,172,235 A    12/1992  Wilm et al.
5,179,441 A    1/1993   Anderson et al.
(Continued)

FOREIGN PATENT DOCUMENTS

DE          4420422 A1      12/1995
DE     102004056349 A1       5/2006
(Continued)

OTHER PUBLICATIONS

Gunthner et al., "An Inertially Stabilised Vehicle Camera System Hardware, Algorithms, Test Drives," IEEE, 2006, pp. 3815-3820.
(Continued)

*Primary Examiner* — Ali Bayat
(74) *Attorney, Agent, or Firm* — Eversheds Sutherland (US) LLP

(57) ABSTRACT

The invention relates to monitoring the area in front of a vehicle by means of an apparatus that comprises at least two imaging devices (110, 120). Provided are a first imaging device (110), which covers a first imaging angle, and a second imaging device (120), which covers a second, greater imaging angle. The first imaging device (110) covers a first zone (111) of the area in front of the vehicle, while at the same time, the second imaging device (120) covers a second zone (121) of the area in front of the vehicle. The two imaging devices (110, 120) are positioned spaced, in particular spaced laterally, from one another such that a central area (140) is covered by both the first and the second imaging devices (110, 120). By fusing the data acquired by the imaging devices (110, 120), a stereo image of the central
(Continued)

Figure 1:
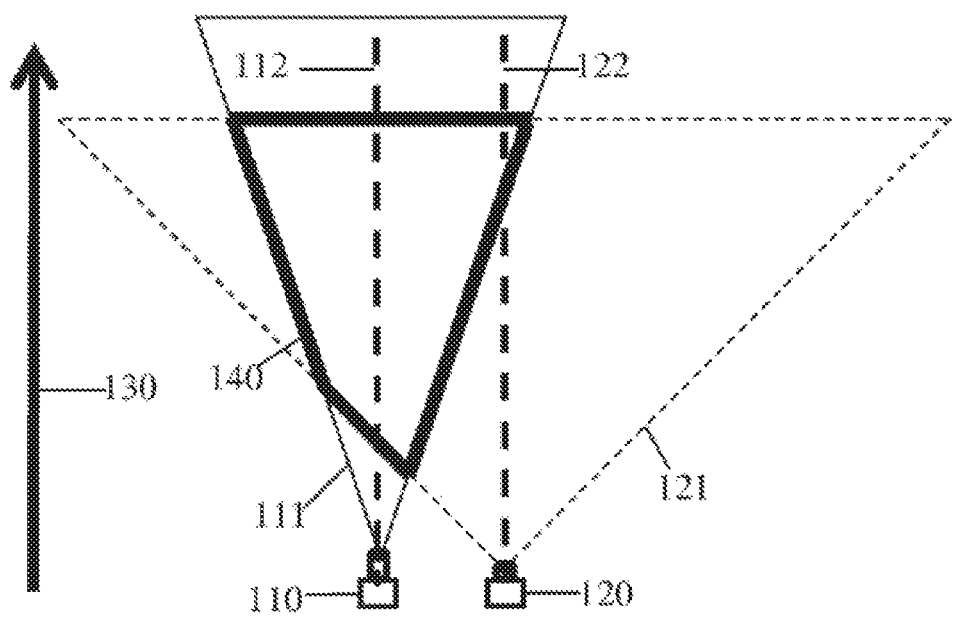

area is generated, while monoscopic images are generated of those zones that are each covered by only a first or a second imaging device.

29 Claims, 1 Drawing Sheet

(51) Int. Cl.
*G06K 9/32* (2006.01)
*H04N 13/02* (2006.01)
*B60R 1/00* (2006.01)
*H04N 13/00* (2018.01)
*G06K 9/62* (2006.01)

(52) U.S. Cl.
CPC ....... *G06K 9/6289* (2013.01); *H04N 13/0007* (2013.01); *H04N 13/0239* (2013.01); *B60R 2300/107* (2013.01); *B60R 2300/301* (2013.01); *B60R 2300/303* (2013.01); *G06K 9/00362* (2013.01)

(58) Field of Classification Search
CPC .. B60R 2300/8053; G06K 9/209; G06K 9/32; G06K 9/62289; G06K 9/6215; G06K 9/00805; G06K 9/00362; H04N 13/0022; H04N 13/0007; H04N 13/0239; G06T 2207/10021; G06T 2207/10028; G06T 2207/20228; G06T 2207/30252
See application file for complete search history.

(56) References Cited

U.S. PATENT DOCUMENTS

| | | | |
|---|---|---|---|
| 5,523,886 A | 6/1996 | Johnson-Williams et al. | |
| 7,180,536 B2 | 2/2007 | Wolowelsky et al. | |
| 7,337,650 B1* | 3/2008 | Preston | B60W 40/11 73/1.38 |
| 8,108,119 B2 | 1/2012 | Southall et al. | |
| 8,885,485 B2 | 11/2014 | Zaencker | |
| 9,588,214 B2* | 3/2017 | Foxlin | G01S 5/163 |
| 2011/0211068 A1 | 9/2011 | Yokota | |
| 2013/0142204 A1 | 6/2013 | Kopetz et al. | |
| 2013/0213518 A1* | 8/2013 | Bonefas | A01D 43/073 141/1 |
| 2015/0043360 A1 | 2/2015 | Poledna | |
| 2015/0288948 A1* | 10/2015 | Schamp | H04N 13/025 348/47 |
| 2016/0291160 A1* | 10/2016 | Zweigle | G01S 17/89 |

FOREIGN PATENT DOCUMENTS

| | | |
|---|---|---|
| DE | 102011118551 A1 | 5/2013 |
| DE | 102012004854 A1 | 9/2013 |
| EP | 1684531 A2 | 7/2006 |
| JP | 2010-103810 A | 5/2010 |
| WO | 2012/085744 A2 | 6/2012 |
| WO | 2013/112284 A1 | 8/2013 |
| WO | 2014/054752 A1 | 4/2014 |
| WO | 2014/054753 A1 | 4/2014 |
| WO | 2015/164897 A1 | 11/2015 |

OTHER PUBLICATIONS

Kopetz, Real-Time Systems, Design Principles for Distributed Embedded Applications, Springer, 2nd Edition (396 pages).
Time Triggered Ethernet, Aerospace Standard AS6802, SAE International, 2011, pp. 1-108.
IEEE Standard for a Precision Clock Synchronization Protocol for Networked Measurement and Control Systems, IEEE Instrumentation and Measurement Society, IEEE, 2008 (289 pages).
Office Action issued in Austrian application No. A 50823/2013, dated Jun. 25, 2014 (3 pages).
International Search Report and Written Opinion for PCT/AT2014/050295, dated Mar. 20, 2015 (15 pages).
Decision to Grant issue in Austrian application No. A 50158/2016, dated May 2, 2017 (2 pages).
European Search Report issued in application No. 17158304.0, dated May 19, 2017 (5 pages).

* cited by examiner

METHOD AND DEVICE FOR OBSERVING THE ENVIRONMENT OF A VEHICLE

The invention relates to a method for monitoring the area in front of a vehicle by means of an apparatus, the apparatus comprising at least two imaging devices, wherein at least one first, preferably precisely one first imaging device covers a first imaging angle, and at least one second, preferably precisely one second imaging device covers a second imaging angle, the second imaging angle being greater than the first imaging angle, and wherein the at least one, preferably precisely one first imaging device covers a first zone of the area in front of the vehicle, particularly the area in close proximity to the front of the vehicle, and wherein, preferably simultaneously, the at least one, preferably precisely one second imaging device covers a second zone of the area in front of the vehicle, particularly the distant area in front of the vehicle.

The invention further relates to an apparatus for monitoring the area in front of a vehicle, the apparatus comprising at least two imaging devices.

Major advances in the field of electronic image processing now allow electronic systems to be designed that can monitor the area surrounding them using imaging devices, which preferably comprise optical sensors, in order to acquire the information necessary for the desired control and regulation of a technical process. The use of such imaging devices, which preferably comprise optical sensors, in vehicles, particularly in motor vehicles, such as automobiles, enables semi-autonomous vehicle guidance (piloted driving).

It is an object of the invention to facilitate piloted driving of vehicles, particularly of motor vehicles, in a cost-effective manner.

This object is attained with an aforementioned method and with an aforementioned apparatus in that, according to the invention, the at least one first imaging device and the at least one second imaging device are arranged spaced, in particular spaced laterally, from one another, and wherein the at least one first imaging device and the at least, one second imaging device are arranged in relation to one another such that a central area, i.e. an area of overlap between the first zone and the second zone, is covered by both the at least one first and the at least one second imaging device, and wherein by fusing the data that are collected by the imaging devices in or from the central area a stereo image is generated, more particularly is generated by a fusion computer, and wherein in or from those zones that are covered by only a first or a second imaging device, a monoscopic image is generated, more particularly is generated by a computer.

The accuracy that is required in monitoring the area surrounding a vehicle is dependent upon the angle between the direction of travel of the vehicle and the monitoring direction. In the direction of travel, distant objects that are far ahead of the vehicle must be accurately monitored, while objects moving transversely to the direction of travel, (for example, children at play), moving toward the vehicle in close proximity, must be detected.

It is therefore proposed according to the invention to provide two imaging devices, a first having a first imaging angle and a second having a second, larger imaging angle.

The imaging devices, also referred to as image capturing devices, capture digital images of the zones of the surroundings they monitor, which are then processed according to the invention as described above. In principle, the imaging devices or image capturing devices are digital cameras.

The first imaging device comprises, for example, an optical sensor and a telephoto lens assigned thereto, and the second imaging device comprises an optical sensor, for example, an identical type of sensor to the first imaging device, with a wide angle lens. The sensors preferably have identical photosensitive surfaces.

In the present text, "optical sensor" refers, for example, to an image sensor, for example, a CCD sensor or CMOS sensor, as are known in principle from digital cameras. The optical sensor may be a color image sensor or a black/white sensor, and the optical sensor may operate in the visible wavelength spectrum or in the invisible wavelength spectrum.

The sensor with the telephoto lens can be used to monitor distant objects in the direction of travel (distant area, zone 2), and the sensor with the wide angle lens can be used to monitor the immediate surroundings of the vehicle to the front and to the sides (close area, zone 1). An arrangement of this type uses both imaging devices or both sensors to monitor an area of overlap, the central area immediately in front of the vehicle, which is of particular importance.

In this area of overlap, which is covered by both imaging devices, a stereo image is generated. Such a stereo image contains more information than a monoscopic image showing the areas that are covered by only one imaging device. The additional information in the stereo image (for example, information regarding the distance of objects being monitored can be derived from the overlapping monoscopic images as part of image processing, without additional physical sensors.

By using imaging devices that have different imaging angles, the imaging areas of which overlap in a central area, the distant surrounding area can be covered monoscopically within a narrow angular range while at the same time the area close to the vehicle can be covered monoscopically within a wide angular range, and simultaneously, the particularly important central area can be covered stereoscopically using only two imaging devices, and thus particularly cost-effectively.

In the searched patent literature [1]-[4] several patents have been found that deal with the generation of stereo images of the area surrounding a vehicle. However, each of the identified patents assumes that two equivalent cameras are used to monitor the area surrounding the vehicle. The generation of a stereo image from the data collected with a camera through a telephoto lens and the data collected with a camera through a wide angle lens, as proposed by the present invention, is not addressed in any of the identified patents.

The method disclosed here according to the invention is of great economic interest because with only two optical sensors, both the surroundings close to the vehicle and toward the side, and the distant surroundings in front of the vehicle can be produced, along with a stereo image of the critical area directly in front of the vehicle.

The central area is defined as the area in which the covered zones as described above over-lap. With a suitable arrangement of the imaging devices and a suitable selection of the different imaging angles, the central area can be placed in the desired region which is considered to be particularly critical.

The present invention is in the field of computer technology. It describes a method and an apparatus with which differentiated images of the area in front of a vehicle can be generated by fusing the data from two, particularly different imaging devices, in particular optical sensors or cameras having different image angles.

Advantageous embodiments of the method according to the invention and the apparatus according to the invention are described in the dependent claims, in which any combination of the preferably technical features enumerated in the following may be implemented:

- the imaging devices each comprise a sensor, in particular an optical sensor, and a lens;
- the at least one first imaging device has a telephoto lens;
- the at least one second imaging device has a wide angle lens;
- the optical axes of the imaging devices, in particular the optical axes of the sensors, are aligned parallel to one another;
- the optical axes of the imaging devices, in particular the optical axes of the sensors, extend parallel to a vehicle longitudinal axis of the vehicle;
- the normal distance between the optical axes of the first and second imaging devices, in particular the optical axes of the optical sensors, is greater than 4 cm;
- the imaging devices have access to a global time base and the times at which data are acquired by the imaging devices are determined by the progression of global time. This allows images to be actually captured simultaneously by the two imaging devices/sensors, if permitted by the imaging device or the sensor, thereby enabling synchronized, simultaneous detection;
- the imaging devices have access to a global time base and the times at which data is acquired by the imaging devices are each defined in a time stamp of the global time assigned to an image. If the imaging devices/sensors do not allow images to be captured precisely at a defined point in time, so that simultaneous image capturing is not possible, and only "associated" image capturing within a time interval is possible, this approach provides a way for "associated." captured images to be merged by taking into account the traveling speed of the vehicle;
- the imaging devices monitor the area surrounding the vehicle cyclically;
- if the first or second imaging device should fail, the area surrounding the vehicle will be monitored by the remaining functional at least one second or at least one first imaging device, and the vehicle will be guided to a safe state, preferably by the fusion computer;
- the focal lengths of the lenses of the imaging devices are adjusted, preferably by the fusion computer, so that objects recognized as relevant in the area surrounding the vehicle are shifted to the center of the field of view of the imaging devices in subsequent frames captured by the imaging devices;
- the orientation of the optical axes of the imaging devices, particularly of the sensors, is adjusted, preferably by the fusion computer, such that the objects recognized as relevant in the area surrounding the vehicle are shifted to the center of the field of view of the sensors in subsequent frames;
- one, a plurality, or all of the imaging devices are mounted on or behind the windshield of the vehicle;
- one, a plurality, or all of the imaging devices are designed for the wavelength range of visible light;
- the imaging devices are designed for a wavelength range beyond the wavelength range of visible light.

In the following, an example of an embodiment of the invention is specified in greater detail in reference to the set of drawings. The drawings show FIG. 1 the positioning of two imaging devices, and FIG. 2 the sequence in which the data acquired by the imaging devices, in particular the sensor data, are processed.

FIG. 1 shows a portion of an apparatus according to the invention, specifically two imaging devices 110, 120. The two imaging devices 110, 120 each comprise, for example, an optical sensor, for example identical optical sensors, and the first imaging device has a telephoto lens, for example, and the second imaging device has a wide angle lens, for example. Accordingly, the imaging angle of second imaging device 120 is greater than the imaging angle of first imaging device 110, as is clear from schematic FIG. 1. The imaging devices are cameras, for example.

Regardless of the specific configuration of the imaging devices, in a preferred embodiment the imaging angle (opening angle), in particular the horizontal imaging angle of the first imaging device, is between 25° and 60°, preferably between 25° and 50°, in particular between about 40° and 50°, and the imaging angle (opening angle), in particular the horizontal imaging angle of the second imaging device is between about 60° and 120°. Depending on the specific selected value for one of the two imaging zones, the second value should be selected such that the zones have different values, in particular such that the second angle is greater than the first angle.

Accordingly, the first imaging device can be used to effectively monitor distant objects, and the second imaging device, which has a lower resolution in distant regions, can be used to monitor the area immediately in front of and to the sides of the vehicle.

In addition, in FIG. 1 an arrow 130 indicates the direction of the vehicle longitudinal axis (but not the specific position) of a vehicle. Optical axis 112 of first imaging device 110 lies parallel to axis 130. The field of view (imaging zone) of first imaging device 110 is represented by an area 111 (zone 1). Optical axis 122 of second imaging device 120 likewise lies parallel to axis 130. The field of view of second imaging device 120 is represented by an area 121 (zone 2 of the surrounding area). Area 140, delimited by a bold line, represents the area surrounding the vehicle that is covered by both imaging devices, thus the "central area".

The distance between the two imaging devices 110, 120, in particular the sensors, measured at right angles to the parallel optical axes 112, 122, is preferably at least 4 cm, to allow a stereo effect to be realized in the central area. In an automobile, the imaging devices may be mounted on the windshield of the vehicle.

The optical sensors of the imaging devices 110, 120 may monitor the area surrounding them in the wavelength range of visible light, or may use a wavelength range beyond that of visible light (e.g., infrared) to monitor the surrounding area. Multiple sensor pairs may also be arranged side by side, one pair for the wavelength range of visible light and another pair for a wavelength range beyond that of visible light.

In the surrounding area that is covered by both imaging devices 110, 120, area 140, a stereo image of this (central) area can be generated, from which information regarding the distance of the vehicle from the detected objects can be determined. In the area that is covered by only one of the two imaging devices 110, 120 (zone 1 111 plus zone 2 121, minus area 140), and is therefore monitored by only one sensor, only a monoscopic image can be produced.

It is preferably assumed that the imaging devices 110, 120, particularly the sensors thereof, have access to a global time. The clocks of the imaging devices can be synchronized using the IEEE 1588 protocol [7].

If the imaging devices 110, 120 or sensors are configured such that the capturing time can be determined by an external trigger signal, the capturing times are triggered by the progression of global time. It is advantageous for the two images to be captured simultaneously. The time at which each image is captured is defined in the form of a global time stamp, in addition to the data structure of the image.

To obtain a chronologically determined sequence of images, the capturing times are triggered cyclically with the same cycle length. The cycle length is preferably obtained from a sampling rate of a total data acquisition system which may contain other sensors in addition to optical sensors, for example, radar sensors, etc.

Figure 2:
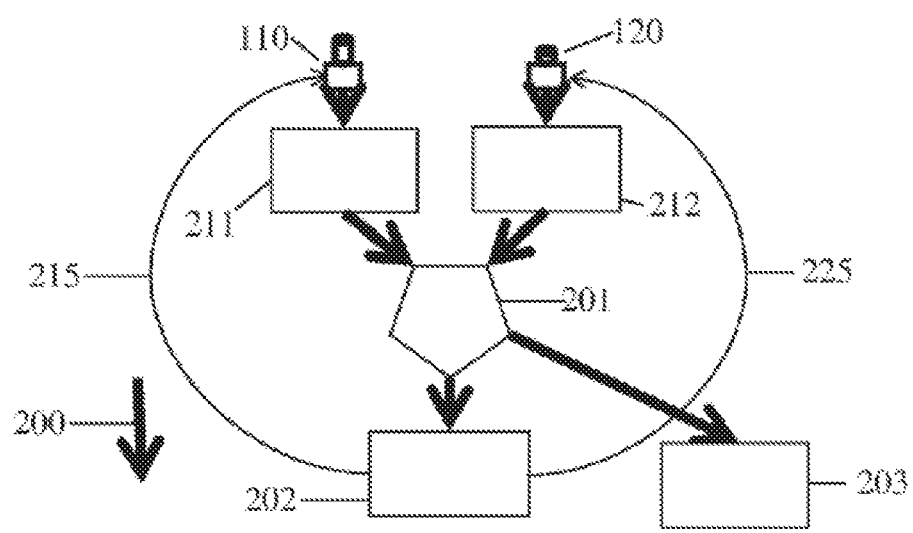

FIG. 2 shows the sequence of steps in the processing of image data in a distributed computer system. Arrows 200 indicate the flow of data. As soon as the image data are acquired by the sensors of imaging devices 110, 120, the image data are pre-processed in computers 211, 212 to identify significant features of the images. These significant features are transmitted via a real-time communication system 201 in the form of messages to the fusion computer ("sensor fusion computer") 202. Optionally, these messages may also be forwarded to a monitor computer 203. The real-time communication system can be implemented using the IT-Ethernet protocol [6]. In addition to the optical sensors of the image processing units, additional sensors, such as radar sensors or laser sensors, may be connected to sensor fusion computer 202.

Sensor fusion computer 202 fuses the pre-processed image data and generates a stereo image for the imaging zone (central area) represented by area 140, and generates a monoscopic image for the imaging zones represented by the areas that are monitored by only one sensor. A method for generating a stereo image from two monoscopic images is disclosed in U.S. Pat. No. 7,180,536 by Wolowelsky, et al.

Optionally it may be provided that, after analyzing an image, sensor fusion computer 202 decides which object in the area surrounding the vehicle is of particular importance, and focuses, for example via a signal line 215, the focal length and/or spatial orientation of the lens and/or sensor of imaging device 110 on that object, and also focuses, via a signal line 225, the focal length and/or spatial orientation of the lens and/or sensor of imaging device 120 on that object.

If an imaging device fails, sensor fusion computer 202 can therefore monitor the area surrounding the vehicle using the remaining functional imaging device(s) and can guide the vehicle to a safe state. Such a safe state involves, for example, parking the vehicle on the roadside or transferring control over the vehicle to the driver.

CITED DOCUMENTS

[1] U.S. Pat. No. 8,108,119 Southhall et al. *Apparatus and Method for Object Detection and Tracking and Roadway Awareness using Stereo Cameras*, Granted Jan. 31, 2012.
[2] U.S. Pat. No. 5,179,441 Anderson et at *Near Real-Time Stereo Vision System*. Granted Jan. 12, 1993
[3] U.S. Pat. No. 5,523,886 Johnson-Williams et al, *Stereoscopc/Molioscopic Video Display System*. Granted Jun. 4, 1996
[4] U.S. Pat. No. 7,180,536 Wolowelsky et al. *Method for producing stereoscopic images from monoscopic images*. Granted Feb. 20, 2007
[5] Kopetz, H. Real-Time Systems, *Design Principles for Distributed Embedded Applications*. Springer Verlag. 2011.
[6] SAE Standard AS6802 from TT Ethernet. URL: http://standards.sae.org/as6802
[7] IEEE 1588 *Standard for a Precision Clock Synchronization Protocol for Network Measurement and Control Systems*. URL: http://www.ieee1588.com/

The invention claimed is:

1. A method of monitoring the area in front of a vehicle, the method comprising:
providing an apparatus, which comprises at least two imaging devices (110, 120), wherein at least one first, preferably precisely one first imaging device (110) covers a first imaging angle, and at least one second, preferably precisely one second imaging device (120) covers a second imaging angle, the second imaging angle being greater than the first imaging angle and wherein the at least one first imaging device (110) and the at least one second imaging device (120) are arranged spaced, in particular spaced laterally, from one another;
covering, with the at least one, preferably precisely one first imaging device (110), a first zone (111) of the area in front of the vehicle, particularly the area in close proximity to the front of the vehicle;
preferably simultaneously, covering, with the at least one, preferably precisely one second imaging device (120), a second zone (121) of the area in front of the vehicle, in particular the distant area in front of the vehicle, wherein the at least one first imaging device (110) and the at least one second imaging device (120) are arranged in relation to one another such that a central area (140), which is an area of overlap between the first zone and the second zone, is covered by both the at least one first and the at least one second imaging device (110, 120);
fusing data acquired by the imaging devices (110, 120) to generate a stereo image of the central area, using a fusion computer (202); and generating a monoscopic image of those zones that are each covered by only a first or a second imaging device, using the fusion computer (202).

2. The method of claim 1, wherein the imaging devices (110, 120) each comprise a sensor, in particular an optical sensor, and a lens.

3. The method of claim 2, wherein the at least one first imaging device (110) has a telephoto lens.

4. The method of claim 2, wherein the at least one second imaging device (120) has a wide angle lens.

5. The method of claim 1, wherein the optical axes (112, 122) of the imaging devices (110, 120), in particular the optical axes of the sensors, are aligned parallel to one another.

6. The method claim 5, wherein the optical axes (112, 122) of the imaging devices (110, 120), in particular the optical axes of the sensors, extend parallel to a vehicle longitudinal axis (130) of the vehicle.

7. The method of claim 1, wherein the normal distance between the optical axes (112, 122) of the first and second imaging devices, in particular the optical axes of the optical sensors, is greater than 4 cm.

8. The method of claim 1, wherein the imaging devices have access to a global time base, and the times at which data are acquired by the imaging devices are determined by the progression of global time.

9. The method of claim 1, wherein the imaging devices have access to a global time base, and the times at which data is acquired by the imaging devices are each defined in a time stamp of the global time assigned to an image.

10. The method of claim 1, wherein the imaging devices monitor the area surrounding the vehicle cyclically.

11. The method of claim 1, wherein if the first or second imaging device should fail, the area surrounding the vehicle will be monitored by the remaining functional at least one second or at least one first imaging device, and the vehicle will be guided to a safe state, preferably by the fusion computer.

12. The method of claim 2, wherein the focal lengths of the lenses of the imaging devices are adjusted, preferably by the fusion computer, such that objects recognized as relevant in the area surrounding the vehicle are shifted to the center of the field of view of the imaging devices in subsequent frames captured by the imaging devices.

13. The method of claim 1, wherein the orientation of the optical axes of the imaging devices, particularly of the sensors, is adjusted, preferably by the fusion computer, such that the objects recognized as relevant in the area surrounding the vehicle are shifted to the center of the field of view of the sensors in subsequent frames.

14. An apparatus for monitoring the area in front of a vehicle, said apparatus comprising:
at least two imaging devices, wherein at least one first, preferably precisely one first imaging device has a first imaging angle which is such that a first zone of the area in front of the vehicle, in particular the area in close proximity to the front of the vehicle, can be covered by the at least one first imaging device, and wherein at least one second, preferably precisely one second imaging device has a second imaging angle which is such that, preferably simultaneously, a second zone of the area in front of the vehicle, in particular the distant area in front of the vehicle, can be covered by the at least one second imaging device, the second imaging angle being greater than the first imaging angle; and
a fusion computer,
wherein the at least one first imaging device and the at least one second imaging device are arranged spaced, in particular spaced laterally, from one another,
wherein the at least one first imaging device and the at least one second imaging device are arranged in relation to one another such that a central area, which is an area of overlap between the first zone and the second zone, is covered by both the at least one first and the at least one second imaging device,
wherein the fusion computer is configured to generate a stereo image of the central area by fusing data relating thereto, acquired by the imaging devices, and
wherein the apparatus is configured to generate a monoscopic image of those areas that are each covered by only a first or a second imaging device, preferably by the fusion computer.

15. The apparatus of claim 14, wherein the imaging devices each comprise a sensor, in particular an optical sensor and a lens.

16. The apparatus of claim 15, wherein the at least one first imaging device has a telephoto lens.

17. The apparatus of claim 15, wherein the at least one second imaging device has a wide angle lens.

18. The apparatus of claim 14, wherein the optical axes of the imaging devices, in particular the optical axes of the sensors, are aligned parallel to one another.

19. The apparatus of claim 18, wherein the optical axes of the imaging devices, in particular the optical axes of the sensors, extend parallel to a vehicle longitudinal axis of the vehicle.

20. The apparatus of claim 14, wherein the normal distance between the optical axes of the first and second imaging devices, in particular the optical axes of the optical sensors, is greater than 4 cm.

21. The apparatus of claim 14, wherein the imaging devices have access to a global time base, and the times at which data are acquired by the imaging devices are determined by the progression of global time.

22. The apparatus of claim 14, wherein the imaging devices have access to a global time base, and the times at which data are acquired by the imaging devices are each defined in a time stamp of the global time assigned to an image.

23. The apparatus of claim 14, wherein the imaging devices monitor the area surrounding the vehicle cyclically.

24. The apparatus of claim 14, wherein if the first or second imaging device should fail, the area surrounding the vehicle will be monitored by the remaining functional at least one second or at least one first imaging device, and the vehicle will be guided to a safe state, preferably by the fusion computer.

25. The apparatus of claim 14, wherein the focal lengths of the lenses of the imaging devices are adjusted, preferably by the fusion computer, such that objects recognized as relevant in the area surrounding the vehicle are shifted to the center of the field of view of the imaging devices in subsequent frames captured by the imaging devices.

26. The apparatus of claim 14, wherein the orientation of the optical axes of the imaging devices, particularly of the sensors, is adjusted, preferably by the fusion computer, such that the objects recognized as relevant in the area surrounding the vehicle are shifted to the center of the field of view of the sensors in subsequent frames.

27. The apparatus of claim 14, wherein the imaging devices are mounted on or behind the windshield of the vehicle.

28. The apparatus of claim 14, wherein one, a plurality, or all of the imaging devices are designed for the wavelength range of visible light.

29. The apparatus of claim 14, wherein one, a plurality, or all of the imaging devices are designed for a wavelength range beyond the wavelength range of visible light.

* * * * *